(12) United States Patent
Kim

(10) Patent No.: US 9,440,184 B2
(45) Date of Patent: Sep. 13, 2016

(54) APPARATUS FOR REMOVING AIR CONTAMINANTS

(76) Inventor: Jong In Kim, Incheon (KR)

( * ) Notice: Subject to any disclaimer, the term of this patent is extended or adjusted under 35 U.S.C. 154(b) by 447 days.

(21) Appl. No.: 13/825,890

(22) PCT Filed: Sep. 21, 2011

(86) PCT No.: PCT/KR2011/006966
§ 371 (c)(1),
(2), (4) Date: Mar. 25, 2013

(87) PCT Pub. No.: WO2012/039584
PCT Pub. Date: Mar. 29, 2012

(65) Prior Publication Data
US 2013/0192471 A1 Aug. 1, 2013

(30) Foreign Application Priority Data

Sep. 24, 2010 (KR) .................. 10-2010-0092765
Sep. 19, 2011 (KR) .................. 10-2011-0094187

(51) Int. Cl.
| | |
|---|---|
| *B01D 53/18* | (2006.01) |
| *B01D 46/10* | (2006.01) |
| *B01D 46/42* | (2006.01) |
| *B01D 47/02* | (2006.01) |
| *B01D 50/00* | (2006.01) |
| *B01D 53/78* | (2006.01) |
| *B01D 53/14* | (2006.01) |
| *F23J 15/02* | (2006.01) |
| *B01D 47/08* | (2006.01) |
| *B01D 53/50* | (2006.01) |
| *B01D 53/62* | (2006.01) |

(52) U.S. Cl.
CPC ............ *B01D 53/185* (2013.01); *B01D 46/10* (2013.01); *B01D 46/42* (2013.01); *B01D 47/021* (2013.01); *B01D 47/028* (2013.01); *B01D 47/085* (2013.01); *B01D 50/006* (2013.01); *B01D 53/1481* (2013.01); *B01D 53/78* (2013.01); *F23J 15/025* (2013.01); *B01D 53/50* (2013.01); *B01D 53/62* (2013.01); *B01D 2247/04* (2013.01); *B01D 2247/107* (2013.01); *B01D 2247/12* (2013.01); *B01D 2247/14* (2013.01); *B01D 2252/103* (2013.01); *B01D 2257/302* (2013.01); *B01D 2257/502* (2013.01);

(58) Field of Classification Search
CPC .................. B01D 2247/04; B01D 2247/107; B01D 2247/12; B01D 2247/14; B01D 2252/103; B01D 2257/302; B01D 2257/502; B01D 2258/0258; B01D 46/10; B01D 46/42; B01D 47/021; B01D 47/028; B01D 47/085; B01D 50/006; B01D 53/1481; B01D 53/185; B01D 53/50; B01D 53/62; B01D 53/78; F23J 15/025; F23J 2217/10; F23J 2217/101; F23J 2219/40
See application file for complete search history.

(56) References Cited

U.S. PATENT DOCUMENTS

| | | | |
|---|---|---|---|
| 3,756,171 A * | 9/1973 | De Bord ................. | 110/215 |
| 5,004,486 A * | 4/1991 | Chen ..................... | 96/240 |
| 2004/0079234 A1* | 4/2004 | Gorbulsky ........ | B01D 46/0035 96/289 |

FOREIGN PATENT DOCUMENTS

| | | | |
|---|---|---|---|
| JP | 01-174029 | 12/1989 | |
| JP | 08-281038 | 10/1996 | |
| KR | 10-1995-0007314 | 7/1995 | |
| WO | WO 03022405 A1 * | 3/2003 | ........... B01D 50/004 |

OTHER PUBLICATIONS

International Search Report for PCT/KR2011/006966 mailed May 22, 2012.

\* cited by examiner

*Primary Examiner* — Duane Smith
*Assistant Examiner* — Cabrena Holecek
(74) *Attorney, Agent, or Firm* — STIP Law Group, LLC

(57) ABSTRACT

The present invention relates to an apparatus for removing air contaminants, which adsorbs dust and harmful substances contained in the air contaminants using an absorbing unit connected to an inlet pipe inserted in a tank.

7 Claims, 2 Drawing Sheets

(a)          (b)

APPARATUS FOR REMOVING AIR CONTAMINANTS

RELATED APPLICATIONS

This application is a 371 application of International Application No. PCT/KR2011/006966, filed Sep. 21, 2011, which in turn claims priority from Korean Patent Application Nos. 10-2011-0094187, filed Sep. 19, 2011, and 10-2010-0092765 mailed Sep. 24, 2010, each of which is incorporated herein by reference in its entirety.

BACKGROUND OF THE INVENTION

1. Field of the Invention

The present invention relates to a removing unit of air pollution material, and more particularly, to a removing unit of air pollution material which can effectively remove air pollutants and dust particles with relatively simple structure.

2. Description of the Related Art

As industries grow and expand, more air pollutants discharged from a wide variety of industries are released into the environment. The major air pollutants are poisonous gases including carbon monoxide emitted from vehicles and sulfurous acid gas mainly discharged from oil refineries.

Therefore, it is important and essential to control air pollutant emissions from exhausts of factories and such for protecting health and environment.

And, toxic dust particles discharged from places such as chemical plants and painting factories can harm health of workers therein and cause severe air pollution if the dust particles are released into the air.

SUMMARY OF THE INVENTION

Accordingly, the present invention has been devised to solve the above-mentioned problems, and an object of the present invention is to provide a removing unit of air pollution material which can effectively remove air pollutants and dust particles with relatively simple structure.

In order to accomplish the above objects, an embodiment of the present invention provides a removing unit of air pollution material, comprising: a tank having an inlet port at one side through the side of which smoke including dust particles and air pollutants flows in, an exhaust port at another side through which filtered air flows out and an internal space formed inside thereof; an inlet pipe being inserted through the inlet port and being extended into inside of the tank; and an absorption unit being connected with the inlet pipe and being installed inside of the tank, wherein the absorption unit is characterized by coming into contact with water inside of the tank and absorbing dust particles and air pollutants from the smoke.

Here, the inlet pipe is preferred to further have a suction fan which forcibly sucks the smoke including dust particles and air pollutants.

And here, the tank is preferred to further comprise: a pipe being formed to be communicated with the water inside of the tank, being formed to be extended to an upper side of the tank and making the water inside of the tank fall from surface of an upper side of the tank; a pump being installed on the pipe and pumping the water inside of the tank to the upper side of the tank through the pipe; and a nozzle being combined with one end of the pipe and spraying the pumped water in the direction of the absorption unit installed at the inlet pipe.

And, the inlet pipe is preferred to have a plurality of through holes formed along an outer surface of a part thereof located inside of the tank, and the absorption unit is preferred to be a non-woven fabric or a fiber web, which wraps one end of the inlet pipe and the part of the inlet pipe where the plurality of through holes are formed.

And, in another embodiment of the present invention, the absorption unit may further comprise: a connecting pipe being connected to one end of the inlet pipe and being bent in the direction of an inner bottom side of the tank; a cover plate having a through hole formed in the middle thereof, wherein the through hole is communicated with one end of the connecting pipe; a closing plate facing to the cover plate and being connected to the cover plate by a plurality of bolts; and a filtering block, being installed between the cover plate and the closing plate, being partially or totally submerged in the water inside of the tank and absorbing the water, can be applied.

Here, the tank is preferred to further have an exhaust pipe, which is protruded to an outer upper side of the tank and exhausts filtered air from the tank, and an exhaust fan which is installed on the exhaust pipe and forcibly exhausts filtered air.

And here, the absorption unit is preferred to further comprise: a communicating pipe being installed inside of the tank and being extended from an exhaust pipe which is protruded to an outer upper side of the tank and exhausts filtered air from the tank; an absorbing member wrapping an outer surface and one end of the communicating pipe and being a non-woven fabric or a fiber web which can absorb water; a drum being installed at an bottom side of the tank, being rotated in one direction by a driving force which is delivered thereto and having an outer surface partially or totally submerged in the water inside of the tank; and a supplying member wrapping an outer surface of the drum, absorbing the water inside of the tank, supplying the water to the absorbing member by a centrifugal force generated by rotation of the drum and being a non-woven fabric or a fiber web.

And, the tank is preferred to further comprise: a drain hopper being placed directly underside of the absorbing member and being communicated with the tank; a drain tank being communicated with one end of the drain hopper; a filter being installed between the drain hopper and the drain tank; a reservoir being placed at where the drum is installed, being communicated with the tank and having the drum inside thereof; and a pump being installed on a pipe connecting the drain tank and the reservoir and supplying the water to the reservoir from the drain tank.

The removing unit of air pollution material according to the present invention is advantageous in that it can effectively remove dust particles and air pollutants with a simply structured unit, wherein the absorption unit, which is connected with the inlet pipe inserted in the tank, absorbs dust particles and air pollutants included in smoke.

And, the removing unit of air pollution material according to the present invention is also advantageous in that it enables an active response to the needs of consumers by adopting a variety of absorption unit structures which may have the inlet pipe wrapped by a non-woven fabric or a fiber web, or which may include the filtering block, being absorbent, installed between plates composing a sandwich-like structure being communicated with the inlet pipe, or which may have a non-woven fabric or a fiber web wrapping around one end of the discharge pipe and absorb dust particles and air pollutants by spraying water by a centrifugal force generated by rotation of the drum which is placed underside of the tank.

BRIEF DESCRIPTION OF THE DRAWINGS

The present invention, together with further advantages thereof, may best be understood by reference to the following description, taken in conjunction with the accompanying drawings in which.

DESCRIPTION OF NUMERALS

Figure 1:
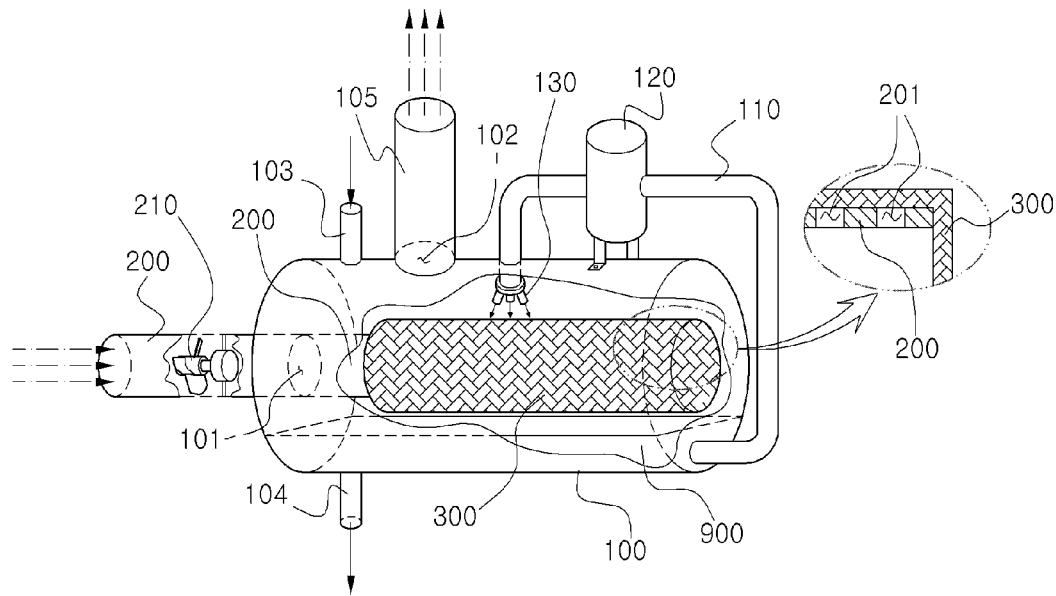
FIG. 1 is a perspective diagram showing an overall schematic of a removing unit of air pollution material according to an embodiment of the present invention.

100: Tank 200: inlet pipe
300: absorption unit

Description of the Preferred Embodiments

Embodiments of the present invention will be described in detail with reference to the accompanying drawings.

Merits and characteristics of the present invention will become apparent from the following embodiments taken in conjunction with the accompanying drawings.

However, the present invention is not limited to the disclosed embodiments, but may be implemented in various ways. The embodiments are provided to complete the disclosure of the present invention and to allow those having ordinary skill in the art to fully understand the scope of the present invention. The present invention is defined only by the scope of the claims.

Hereinafter, embodiments of the present invention will be described with reference to the drawings which illustrate a removing unit of air pollution material.

The same reference numerals will be used throughout the drawings to refer to the same or like elements.

FIG. 1 is a perspective diagram showing an overall schematic of a removing unit of air pollution material according to an embodiment of the present invention.

In FIG. 1, a dash-dot arrow represents a moving direction of gaseous materials such as filtered air or smoke including dust particles and air pollutants, and a continuous-line arrow represents a moving direction of water. Arrows in other drawings represents the same meaning.

According to FIG. 1, the present invention provides a removing unit of air pollution material which can absorb dust particles and air pollutants with an absorption unit 300, which is connected to an inlet pipe 200 that is inserted into a tank 100.

The tank 100 has an inlet port 101 at one side through the side of which smoke including dust particles and air pollutants flows in, an exhaust port 102 at another side through which filtered air flows out and an internal space formed inside thereof for providing a space for the inlet pipe 200 and the absorption unit 300 installed therein.

For reference, in FIG. 1, reference number 105 indicates an exhaust pipe which is connected to the exhaust port 102.

The inlet pipe 200 is inserted through the inlet port 101 and extended into inside of the tank 100. And also the inlet pipe 200 is connected with a connecting pipe 310, thus forming a flow passage through which smoke including dust particles and air pollutants flows in.

The absorption unit 300 is connected with the inlet pipe 200 and is installed inside of the tank 100. And also the absorption unit 300 comes into contact with water 900 inside of the tank 100 and absorbs dust particles and air pollutants from the smoke.

Although an embodiment of the present invention has been described above, other various embodiments can be adopted as described hereinafter.

The tank 100, which provides a space for the inlet pipe 200 and the absorption unit 300 installed therein, further has a filling pipe 103 through which water is supplied from an outer source and a discharge pipe 104 through which the water 900 inside of the tank 100 is discharged. And the absorption unit 300, which is placed separately from the water 900 inside of the tank 100, absorbs dust particles and air pollutants from smoke.

Here, the inlet pipe 200 is preferred to further have a suction fan 210 which forcibly sucks the smoke including dust particles and air pollutants into inside of the tank 100.

And here, the inlet pipe 200 is preferred to have a plurality of through holes 201 formed along an outer surface of a part thereof located inside of the tank 100, and the absorption unit 300 is preferred to be a non-woven fabric or a fiber web, which wraps one end of the inlet pipe 200 and the part of the inlet pipe 200 where the plurality of through holes 201 are formed.

And, a material with slight elasticity can be adopted to the absorption unit 300 for keeping the absorption unit 300 tight around the inlet pipe 200, or the absorption unit 300 can be fastened around the inlet pipe 200 by a fastening tool and such.

And also the tank 100 may have a nozzle 130 at one end of a pipe 110 and may pump the water 900 inside of the tank 100 through the pipe 110 by a pump 120, thus maintaining absorption performance of the absorption unit 300.

Thus, the pipe 110 is formed to be communicated with the water 900 inside of the tank 100 and to be extended to an upper side of the tank 100, and thus making the water 900 fall from surface of an upper side of the tank 100;

Here, the pump 120 is installed on the pipe 110 and pumps the water 900 inside of the tank 100 to the upper side of the tank 100 through the pipe 110, and the nozzle 130 is combined with one end of the pipe 110 and sprays the pumped water 900 in the direction of the absorption unit 300 installed at the inlet pipe 200.

Figure 2:
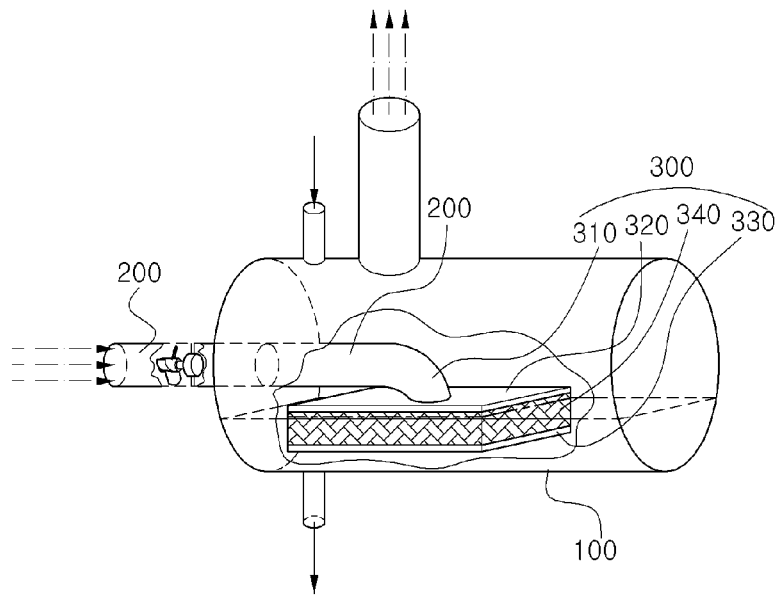
FIG. 2 is a perspective diagram showing an overall schematic of a removing unit of air pollution material according to another embodiment of the present invention.
Figure 3:
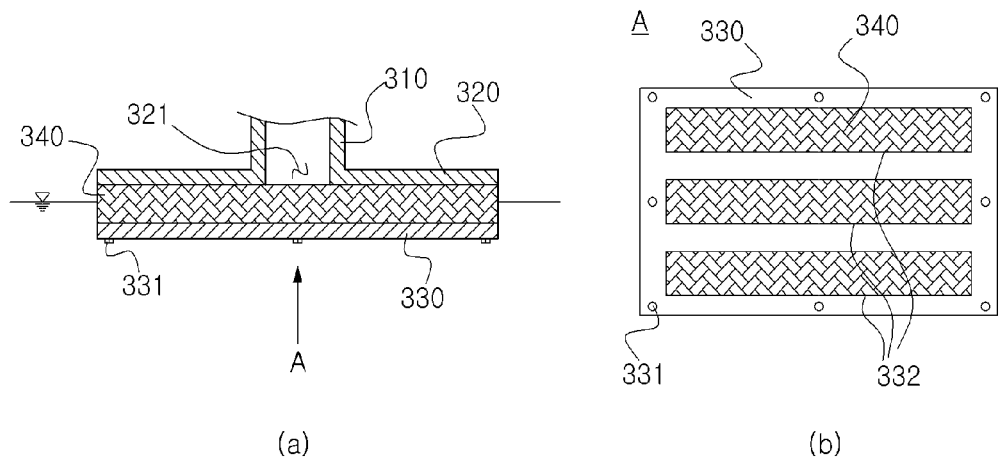
FIG. 3 is a schematic diagram showing structure of an absorption unit which is a principal part of the removing unit of air pollution material according to another embodiment of the present invention.
Figure 4:
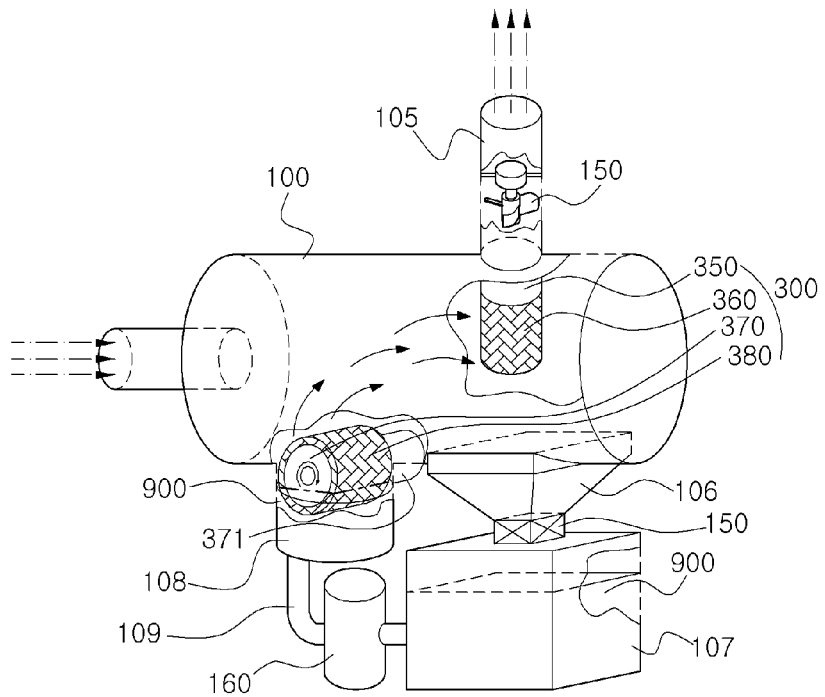
FIG. 4 is a perspective diagram showing an overall schematic of a removing unit of air pollution material according to still another embodiment of the present invention.

Meanwhile, in another embodiment of the present invention, a sandwich-like structure as shown in FIG. 2 and FIG. 3 can be adopted to the absorption unit 300.

FIG. 2 is a perspective diagram showing an overall schematic of a removing unit of air pollution material according to another embodiment of the present invention, and FIG. 3 is a schematic diagram showing structure of the absorption unit 300 which is a principal part of the removing unit of air pollution material according to another embodiment of the present invention.

Here, the absorption unit 300 can further comprise: a connecting pipe 310 being connected to one end of the inlet pipe 200 and being bent in the direction of an inner bottom side of the tank 100; a cover plate 320 having a through hole 321 formed in the middle thereof, wherein the through hole 321 is communicated with one end of the connecting pipe 310; a closing plate 330 facing to the cover plate 320 and being connected to the cover plate 320 by a plurality of bolts 331; and a filtering block 340, being installed between the cover plate 320 and the closing plate 330, being partially or totally submerged in the water 900 inside of the tank 100 and absorbing the water 900.

And here, it is preferred that the closing plate 330 has a plurality of absorption slits 332 formed therein, so that the filtering block 340 and the water 900 inside of the tank 100 can communicate with each other.

Meanwhile, in still another embodiment of the present invention, dust particles and air pollutants can be absorbed by water which is supplied by a centrifugal force.

Here, the tank 100 can further have an exhaust pipe 105 which is protruded to an outer upper side of the tank 100 and an exhaust fan 150 which is installed on the exhaust pipe 105, so that filtered air can be forcibly exhausted through the exhaust pipe 105.

And here, the absorption unit 300 has a structure wherein a supplying member 380 wrapping an outer surface of the drum 370 supplies the water 900 inside of the tank 100 to the absorbing member 360 installed on a communicating pipe 350 by a centrifugal force generated by rotation of the drum 370.

The communicating pipe 350 is extended from the exhaust pipe 105 and is installed inside of the tank 100, and the absorbing member 360 wraps an outer surface and one end of the communicating pipe 350 and is a non-woven fabric or a fiber web which can absorb water.

The drum 370, installed at a bottom side of the tank 100, is rotated in one direction by a driving force which is delivered from a driving motor 371 thereto and has an outer surface partially or totally submerged in the water 900 inside of the tank 100. And the supplying member 380, which wraps the outer surface of the drum 370 and absorbs the water 900 inside of the tank 100, supplies the water 900 to the absorbing member 360 (illustrated with continuous-line arrows) by a centrifugal force generated by rotation of the drum 370 and is a non-woven fabric or a fiber web.

Here, the tank 100 can further comprise a drain hopper 106, a drain tank 107, a filter 111, a reservoir 108 and a pump 160, for effectively supplying the water 900 to the absorption unit 300.

Here, the drain hopper 106 is placed directly underside of the absorbing member 360 and is communicated with the tank 100, and the drain tank 107 is communicated with one end of the drain hopper 106 and temporarily stores the fallen water 900. And the filter 150 is installed between the drain hopper 106 and the drain tank 107 and filters dust particles and air pollutants which are absorbed along with the water 900 by the absorbing member 360.

And, the reservoir 108, which is placed at where the drum 370 is installed, is communicated with the tank 100 and has a space formed inside thereof for installing the drum 370. And also the pump 160 is installed on a pipe 109 connecting the drain tank 107 and the reservoir 108 and supplies the water 900 to the reservoir 108 from the drain tank 107.

As described above, the technological thought of the present invention is to provide a removing unit of air pollution material which can effectively remove air pollutants and dust particles with relatively simple structure.

It will be understood by those having ordinary skill in the art to which the present invention pertains that the present invention may be implemented in various specific forms without changing the technical spirit or indispensable characteristics of the present invention. Accordingly, it should be understood that the above-mentioned embodiments are illustrative and not limitative from all aspects. The scope of the present invention is defined by the appended claims rather than the detailed description, and the present invention induced from the meaning and scope of the appended claims and their equivalents.

What is claimed is:

1. A removing unit for the removal of air pollution material, comprising:
    a tank having an inlet port at a first side of the tank, an exhaust port at a second side of the tank, and an internal space formed inside the tank, wherein smoke including dust particles and air pollutants flows in the tank through one side of the inlet port, and filtered air flows out of the tank through the exhaust port;
    an inlet pipe inserted through the inlet port and extended into inside of the tank; and
    an absorption unit connected with the inlet pipe and installed inside of the tank,
    wherein the absorption unit contacts water inside of the tank and absorbs dust particles and air pollutants from the smoke,
    wherein the inlet pipe includes a plurality of through holes formed along an outer surface of a part thereof located inside of the tank, and
    wherein the absorption unit is a fiber web, which wraps one end of the inlet pipe and the part of the inlet pipe where the plurality of through holes are formed.

2. The removing unit for the removal of air pollution material according to claim 1, wherein the inlet pipe has a same diameter in the entire region.

3. The removing unit for the removal of air pollution material according to claim 1, wherein the inlet pipe further comprises a suction fan which forcibly sucks the smoke including dust particles and air pollutants.

4. The removing unit for the removal of air pollution material according to claim 3, wherein the tank further comprises:
    a pipe being formed to be communicated with the water inside of the tank, being formed to be extended to an upper side of the tank and making the water inside of the tank fall from surface of the upper side of the tank;
    a pump being installed on the pipe and pumping the water inside of the tank to the upper side of the tank through the pipe; and
    a nozzle being combined with one end of the pipe and spraying the pumped water in the direction of the absorption unit installed at the inlet pipe.

5. The removing unit for the removal of air pollution material according to claim 1, wherein the tank further comprises:
    a pipe being formed to be communicated with the water inside of the tank, being formed to be extended to an upper side of the tank and making the water inside of the tank fall from surface of the upper side of the tank;
    a pump being installed on the pipe and pumping the water inside of the tank to the upper side of the tank through the pipe; and
    a nozzle being combined with one end of the pipe and spraying the pumped water in the direction of the absorption unit installed at the inlet pipe.

6. The removing unit for the removal of air pollution material according to claim 5, wherein the pipe consists of a first pipe portion and a second pipe portion, the first pipe portion directly contacting a lower side of the tank and the second pipe portion directly contacting the upper side of the tank, wherein the pump is between the first pipe portion and the second pipe portion.

7. The removing unit for the removal of air pollution material according to claim 5, wherein the pump directly contacts the upper side of the tank.

* * * * *